United States Patent
Mitchell et al.

(10) Patent No.: US 6,762,994 B1
(45) Date of Patent: Jul. 13, 2004

(54) HIGH SPEED TRAFFIC MANAGEMENT CONTROL USING LOOKUP TABLES

(75) Inventors: Charles Mitchell, Nepean (CA); Tom Davis, Ottawa (CA); Natalie Giroux, Ottawa (CA)

(73) Assignee: Alcatel Canada Inc., Kanata (CA)

(*) Notice: Subject to any disclaimer, the term of this patent is extended or adjusted under 35 U.S.C. 154(b) by 0 days.

(21) Appl. No.: 09/290,174

(22) Filed: Apr. 13, 1999

(51) Int. Cl.[7] .............................................. H04L 12/56
(52) U.S. Cl. ........................ 370/229; 370/230; 370/232
(58) Field of Search ................................. 370/230, 231, 370/234, 235, 236, 252, 412, 413, 418, 229, 232

(56) References Cited

U.S. PATENT DOCUMENTS

| | | | |
|---|---|---|---|
| 5,694,390 A | * 12/1997 | Yamato et al. | 370/230 |
| 5,777,984 A | * 7/1998 | Gun et al. | 370/230 |
| 5,812,527 A | * 9/1998 | Kline et al. | 370/232 |
| 5,936,939 A | * 8/1999 | Des Jardins et al. | 370/229 |
| 5,940,368 A | * 8/1999 | Takamichi et al. | 370/229 |
| 5,940,375 A | * 8/1999 | Soumiya et al. | 370/249 |
| 6,034,945 A | * 3/2000 | Hughes et al. | 370/230 |
| 6,044,079 A | * 3/2000 | Calvignac et al. | 370/230 |
| 6,345,037 B2 | * 2/2002 | St-Denis et al. | 370/230 |

OTHER PUBLICATIONS

The ATM Forum Technical Committee, Traffic Management Specification Version 4.0, Apr. 1996.

* cited by examiner

*Primary Examiner*—Wellington Chin
*Assistant Examiner*—William Schultz
(74) *Attorney, Agent, or Firm*—Marks & Clerk

(57) ABSTRACT

A system and method for managing high speed traffic though switching elements in a digital network such as an asynchronous transfer mode (ATM) network. The system applies in particular to available bit rate (ABR) and unspecified bit rate (UBR) categories of service in an ATM network. ABR traffic incorporates resource management cells (RM) in a feed back loop from destination to source for the purpose of carrying explicit rate (ER) congestion control information. Lookup tables are provided in order to quickly provide ER information to the RM cells. UBR traffic is subject to cell discard in the event of congestion. Lookup tables are provided in order to fairly apply an early packet discard (EPD) algorithm.

13 Claims, 3 Drawing Sheets

HIGH SPEED TRAFFIC MANAGEMENT CONTROL USING LOOKUP TABLES

FIELD OF THE INVENTION

This invention relates to high speed digital switching systems such as asynchronous transfer mode (ATM) networks for servicing multiple categories of traffic and more particularly to a lookup table approach for making complex decisions and/or variable updates at high speed in such systems.

BACKGROUND

The use of Asynchronous Transfer Mode (ATM) by a continuously widening set of applications is driving a requirement for efficient dynamic allocation of bandwidth. The ATM Forum has specified (Traffic Management Specification, Version 4.0) two best effort service categories that provide flexible access to bandwidth: the Available Bit Rate (ABR) category; and the Unspecified Bit Rate (UBR) category.

In general an ATM switch can be viewed as a system with two or more physically separate ingress ports which bring ATM cells to the switch, and an equal number of physically separate egress ports to which ATM cells are sent. ATM is inherently a connection oriented system and individual connections on ingress and egress links are identified by using the virtual path identifier (VPI) and virtual channel identifier (VCI) fields of the standard ATM cell. Within an ATM switch it is convenient to identify connections with a more compact identifier. A Connection Identifier (CI) is used for this purpose. Connections of different types may be configured on a single port—for example a connection may belong to the ABR or UBR categories mentioned above.

Since it is possible that all ingress ports may transmit cells to a given egress port simultaneously, buffers are required at each egress port to absorb transient periods in which the ATM cell service rate is less than the arrival rate. A queuing function is required at each port to manage the buffers for that port. A conventional queuing function consists of one or more queues, and an arbitration function that decides which queue to service at each cell departure time. Typical queuing function implementations queue ABR cells separately from UBR cells.

The ABR category of service employs a rate-based flow control scheme where sources only send data at a rate that the network elements along the path of the connection can handle without overflowing their queues. The ABR protocol allows many options and leaves many details to be implementation specific. Achieving high link utilization demands that the network elements accurately indicate the data rates that they can accept. Furthermore, it is important that bandwidth contending for a congested queuing resource be allocated 'fairly' to each connection.

Explicit Rate (ER) ABR is a scheme whereby each switch in the data path of an ABR connection calculates an explicit cell rate at which the source is allowed to transmit and sends that information to the source in a special resource management (RM) cell.

UBR is a service category that is specified to allow the sustained mean aggregate arrival rate of connections into a queue to exceed the service rate. As a result, it is probable that a queue containing UBR connections will overflow and cells will be discarded. It is desirable to implement cell discard mechanisms that ensure that connections are treated fairly when cells are discarded. In addition, it is desirable to provide a UBR service that can, in a configurable manner, give better service to some connections than others. This is called a differentiated service.

A large number of data applications use the standard ATM Adaptation Layer 5 (AAL5) method of segmenting data packets into ATM cells. For these applications it is desirable to discard entire AAL5 packets instead of individual cells that may only be a portion of a packet. Early Packet Discard (EPD) is a scheme that discards entire packets, e.g. AAL5 packets. EPD is also useful for ABR and UBR connections.

In general, as the rate at which telecommunication systems operate increases, it becomes increasingly difficult to update important variables in sophisticated flow control schemes (such as ABR ER) or to arrive at a decision whether to apply EPD or not. While the time allowed to do calculations shrinks, efforts to increase the efficiency of the network demands that more and more complex equations be implemented. The current state of the art is to use either specialized RISC (Reduced Instruction Set Computer)-based compute engines (such as the ATMizer from LSI Logic) or to design application specific integrated circuits (ASICs) to do the necessary calculations. A major problem with these current approaches is the expense in dollar cost, power and area. Another problem is the complexity of current implementations and the difficulty in easily making modifications, i.e. either ASICs need to be changed or complex low level RISC code must be modified.

SUMMARY OF THE INVENTION

This invention solves the problem of doing complex real-time calculations to update variables in flow control systems by using Lookup tables. The memory based lookup table is low cost, low power, fast, real-estate efficient and flexible. Not only can arbitrarily complex functions be implemented but tools can be provided to make the programming of the table straight-forward, thereby offering a means for the customer (the network provider) to differentiate service offerings.

Therefore, in accordance with a first aspect of the invention there is provided in a connection oriented digital switching network having statistical multiplexing a system for implementing congestion control between multiple connection queues comprising: means to obtain statistical information respecting each queue; a lookup table containing threshold information; comparison means to compare the statistical information with the threshold information; and means to discard data if the statistical information exceeds a threshold.

In accordance with a second aspect of the invention there is provided a lookup table for use in a congestion control scheme for an asynchronous transfer mode (ATM) network servicing multiple connection categories, said lookup table comprising a programmable memory for storing queue related threshold information.

In accordance with a further aspect of the invention there is provided a method of managing traffic through a high speed, digital switching network having multiple :connections, each with queuing means to buffer statistical traffic, said method comprising: monitoring traffic in each queue; providing a lookup table with queue threshold information; and marking traffic eligible for early packet discard (EPD) in accordance with threshold information specified in the lookup table.

In a preferred embodiment the lookup table includes information for use in implementing an early packet discard (EPD) algorithm.

In a further preferred embodiment the lookup table also includes information for use in marking resource management cells of ABR traffic with explicit rate information.

BRIEF DESCRIPTION OF THE DRAWINGS

The invention will now be described in greater detail with reference to the attached drawings wherein.

DETAILED DESCRIPTION OF THE INVENTION

Figure 1:
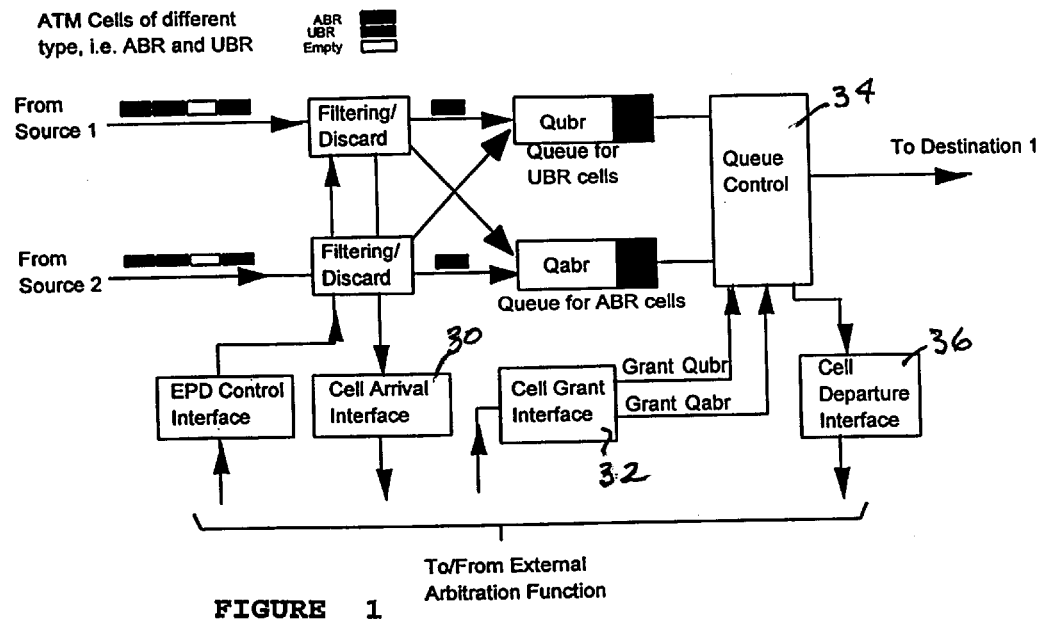
FIG. 1 is a high level diagram of an example of an ATM queuing function.

FIG. 1 shows a high level block diagram of a queuing function that receives ATM cells from two inputs, source 1 and source 2, maintains separate queues for ABR and UBR, Qabr and Qubr respectively, and provides a single output (to destination 1).

When cells arrive at the inputs to the queuing function, a filtering function determines in which, if any, of the queues the cell should be enqueued. This is typically done by looking in the cell's header to determine the cell's category. If the indicated queue is full the cell is discarded. The cell arrival interface 30 informs an external arbitration function of the arrival of each and every cell. The arbitration function makes the decision of which queue to service during the next cell departure time—either the ABR queue (Qabr) or the UBR queue (Qubr)—and instructs the queuing function to service that queue via the cell grant interface 32.

As a queue may contain cells from different connections and cells from different connections will have different CIs, the queue control block 34 passes the CI of the granted cell to the cell departure interface 36. The cell departure interface 36 then forwards this information to the external arbitration function.

Note that FIG. 1 is a simple example used for illustrative purposes. This queuing function implements aggregate queuing, wherein cells associated with multiple virtual connections are aggregated into a single queue. A more complex queuing function will have more queues per destination. Moreover, queues may be based on more categories, for example constant bit rate (CBR) and variable bit rate (VBR), or there may be an individual queue for each connection (per VC queuing). It should be apparent to the skilled artisan that the present invention may be readily applied to various forms and types of queuing functions.

The following text describes an algorithm, typically referred to as the congestion bias (CB) algorithm which calculates an ER value for each connection. For more details concerning the CB algorithm see U.S. patent application Ser. No. 08/878,964 filed Jun. 19, 1997, the contents of which are incorporated herein by reference. To implement, define a recursive variable, OBW, which is iteratively adjusted as a function of the aggregate ABR queue size, Qabr. OBW is simply a control variable and has no physical meaning. OBW can be initialized to 1. Define MCRi as the minimum cell rate for each connection, i (e.g. CI=i). Define ERi as the explicit rate calculated for each connection, i. Define a threshold, Tabr, against which the ABR queue size, Qabr, is compared. Define F as an increase factor which is engineered to a value strictly greater than unity. Define PCRi to be the maximum (peak) rate at which a source is permitted to transmit over connection i.

PCRi and MCRi are either signalled by the customer premise equipment, or configured by the service provider at the out of band request of the customer. Tabr is a configurable threshold.

Periodically, the following calculation is performed:

If $(Qabr<Tabr)\{$ $$OBW=OBW*F. \quad (A)$$

} Else {

$$OBW=OBW/F.$$

}

Preferably, on arrival of a cell for a particular connection, i, the following calculation is performed:

$$ERi=\min(PCRi, MCRi*OBW). \quad (B)$$

The above two calculations in conjunction with-feedback of the ER field to the source comprise a closed loop control of the queue size, Qabr. The target queue size is Tabr. Note that any function that causes the rate to decrease when Qabr>Tabr and increase when Qabr<Tabr will act to track the queue size to Tabr. The invention allows for arbitrarily complex functions without any increase in implementation complexity. In addition, the invention allows for the consideration of other variables besides Qabr in the calculation of OBW.

In the following description regarding a cell discard mechanism for UBR it should be understood that the action to discard a cell can be replaced by the action to perform EPD whereby the next complete AAL5 packet will be discarded. The following is an example of a cell discard mechanism which provides differentiated and fair service.

Consider a single queue containing UBR connections. Assign a value, MCRi, to each connection, i, where a higher value for MCRi represents a higher level of service. Define a connection to be active if it has one or more cells outstanding in the queue. Define the weighted sum of active connections, WAC, as the sum of the MCRi of all active connections. Maintain a count, Qubr, of the total number of cells in the queue. Maintain a count, Qi, for the number of cells in the queue for each connection, i. Define a threshold, Tubr, against which the count, Qubr, is compared. Tubr is a configurable threshold.

Perform the following logic on cell arrival. A discard threshold, Ti, is calculated on every cell arrival and is compared with the connection cell count, Qi.

If $(Qubr>Tubr)\{$ $$Ti=(Qubr*MCRi)/WAC. \quad (C)$$

If $(Qi>Ti)($

Discard the cell.

}

}

The above calculation illustrates one method for calculating the threshold, Ti, which represents the fair share value for the queue. The invention allows for an arbitrarily complex function for calculating Ti based on Qubr, WAC, and MCRi without an increase in implementation complexity.

Figure 2:
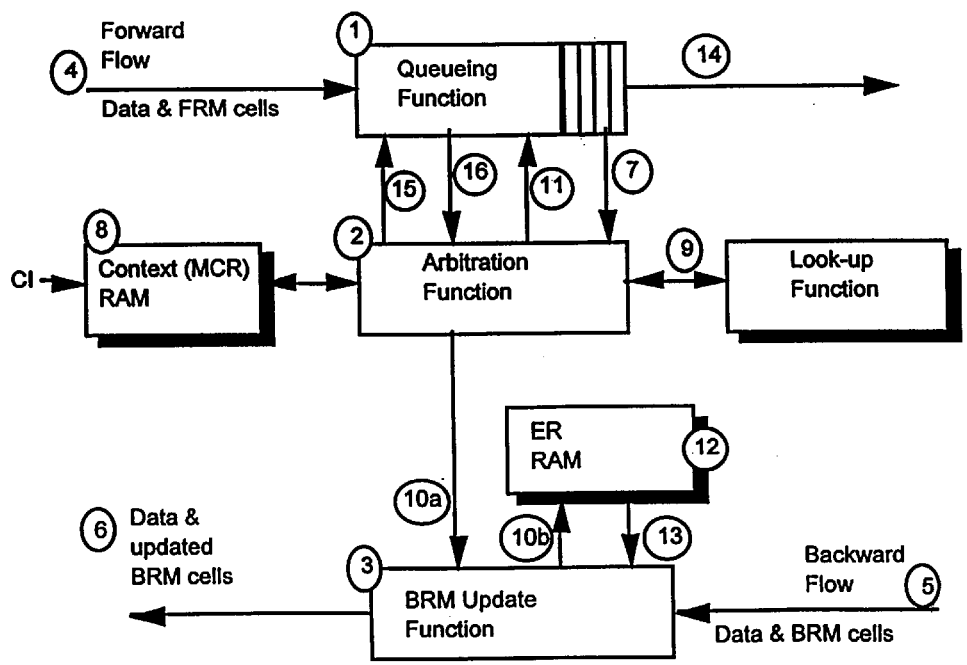
FIG. 2 illustrates a generalized queuing point in an ATM switching system.

FIG. 2 shows a high level block diagram of a generalized queuing point in an ATM switching system. Item 1 is the Queuing Function—it receives ATM cells from many connections (see FIG. 1). Individual connections are uniquely identified with a Connection Identifier (CI).

Item 2 is an Arbitration Function—it monitors ATM cell arrivals (4) via the cell arrival interface (7) and issues cell grant commands back to the Queuing Function (item 11). The grant of particular queues within the queuing point results in a corresponding ATM cell departure (14). With the cell arrival information (7) the arbitration function maintains various information such as: the current cell count per connection (Qi), the weighted number of active connections (WAC) in the queue, and the current cell count per queue (Qubr and Qabr).

Item 3 is the Backward Resource Management BRM update function. In the ABR protocol special resource management (RM) cells flow from the source along with the data in the direction being controlled (FRM cells) and these cells are 'looped-back' at the destination to form a backward flow (BRM cells). This BRM update function acts upon the BRM cells if the locally calculated ERi value (which indicates the maximum rate that this queuing point can handle) is less than the ER value already in the BRM cell. All other data cells and BRM cells that have an ER value less than the local ERi value are simply forwarded by the BRM update function.

Item 4 represents the above mentioned forward data flow and the associated FRM cells arriving at the queuing point. This is shown as a single input, however as previously mentioned, this input may carry ATM cells from multiple sources.

Item 5 represents the above mentioned backward flow with it's associated BRM cells. Item 6 shows that, if instructed by the arbitration function, the BRM update function will modify the BRM cells in the backward direction.

Item 7 shows the cell arrival interface by which the queuing function informs the arbitration function of the priority (ABR, UBR) of the arriving ATM cell and the cell's particular Connection Identifier (CI).

Item 8 shows the interface between the arbitration function and a RAM block used to store per-VC information. Per-VC information consists of a dynamic component—the VC cell count (Qi), and a static component, the Minimum Cell Rate (MCRi) of the connection (which is programmed at connection set-up).

While the OBW calculation is performed on a periodic basis that is long compared to an ATM cell time (e.g. an ATM Cell time at a typical queuing point within Newbridge's 36170 ATM switch is 600 ns), the ERi calculation should be performed within an ATM cell time in order to allow back-to-back processing of a large number of connections.

In the implementation illustrated in FIG. 2, the ERi calculation for connection i is performed by the arbitration function (2) upon the arrival of any cell from that connection. The resulting ERi for the connection is forwarded to the BRM update function (via interface 10*a*) where it is stored in the BRM update function's ER RAM (item 12) via interface 10*b*.

When BRM cells arrive at the BRM update function, the ER value in the BRM cell is compared to the connection's corresponding ERi value stored in the ER RAM (12) and if the value in the ER RAM is less than the value in the BRM cell the BRM update function will overwrite the ER value in the BRM cell with the ERi value in the ER RAM.

Item 9 shows the interface between the arbitration function and a lookup table. The lookup table provides an extremely cost and real-time efficient method of arriving at congestion control decisions. Memory technology is at the point where arbitrary functions of many bits is cost effective.

Item 15 shows the interface over which the arbitration function, having arrived at a decision to apply EPD, instructs the queuing function to apply EPD.

Figure 3:
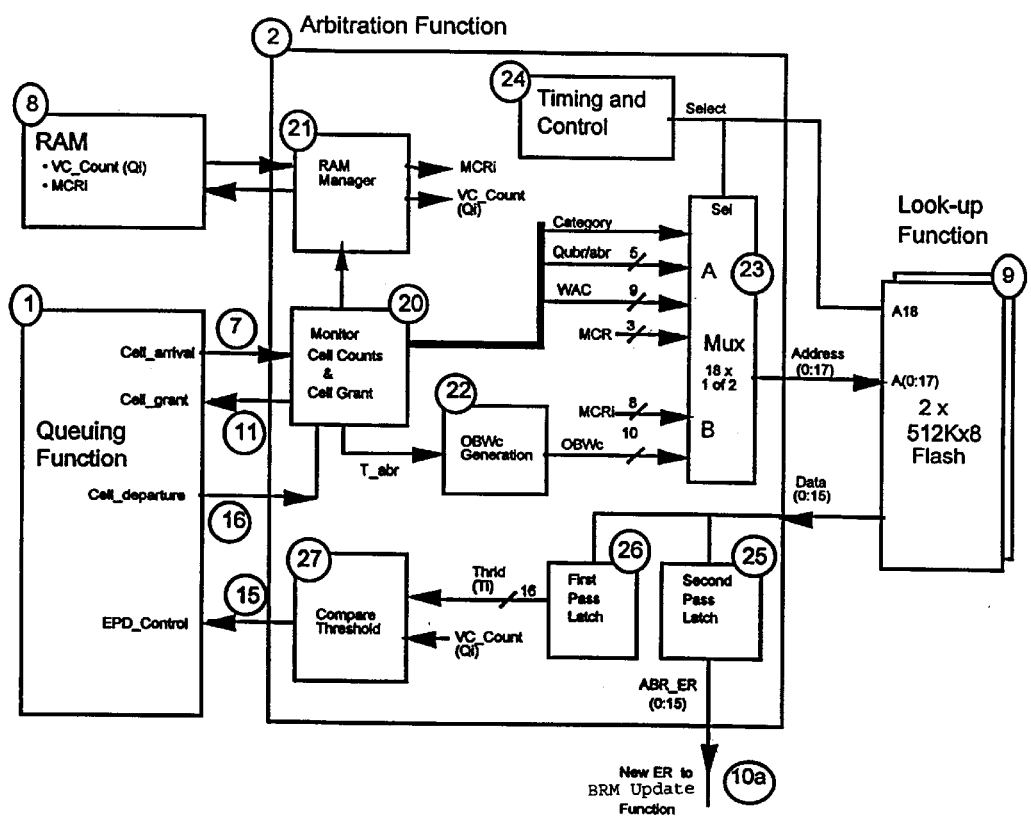
FIG. 3 illustrates an example implementation of the system according to the invention.

FIG. 3 shows a more detail example of this invention.

Item 1 shows the queuing function which is implemented in an ASIC. This ASIC indicates, through it's cell arrival interface (7), when ATM cells arrive, and services it's internal queues as instructed by the arbitration function's cell grant interface (11). The ASIC also allows the Arbitration Function to put individual connections into the EPD state via a control interface (15).

Item 2 is the Arbitration Function, shown in more detail. In this case the arbitration function is implemented in a field programmable gate array such as an Altera FPGA—a 10K50. Item is a block that monitors cell arrivals (via the cell arrival interface—item 7) and maintains, among other things, queue depth and—using the CI of the arriving cell—per-VC counts. On every cell arrival the previous per-VC count is accessed in local RAM (8) by the RAM manager (21), and the count is incremented (by 20). Item (20) is also responsible for granting cell departure instructions back to the queuing function via the cell grant interface (11). Once the queuing function has selected a cell from the specified queue, it communicates the CI of the cell back to the arbitration function via the cell departure interface (16). This departure information is used to decrement the connection's per-VC count. The monitoring block also provides information that will be used as address inputs to the Lookup Table. The information is:

Category: This single bit of information indicates whether the arriving cell is a UBR cell or an ABR cell. For example, if this bit is '0' then the cell is a UBR cell, else it is an ABR cell.

Qubr/abr: Depending on the category, this 5 bit value is the 5 most significant bits of that category's queue fill level.

WAC: Weighted Active Connections. The sum of the MCRi of all active connections. An active connection is defined to have a per-VC count (Qi) of greater than zero.

MCRI: Minimum Cell Rate. This is per connection (CI=i) context that is programmed in the local RAM (8). The number of significant bits used for MCRI depends on whether it is being used for the cell discard/EPD calculation or the ERi calculation. An MCRi of 3 bits is used for determining whether EPD should be applied to a connection and an MCRi of 8 bits is used to determine the ERi of an ABR connection.

While OBW, as defined is equation (A) above, could be calculated using the lookup table (resulting in two passes through the lookup table to arrive at an ERi result), this implementation takes advantage of the simple nature of the OBW calculation and the flexibility of the lookup table concept. Equations A and B are rewritten as follows:

If $(Qabr<Tabr)\{$ $OBWc=OBWc+1.$ (A2)

$\}$ Else $\{$ $OBWc=OBWc-1.$ $\}$ $ERi=\min(PCRi, MCRi*F^{\wedge}OBWc)$ (B2)

Using the above method, OBWc becomes a simple up/down counter. This is implemented in block 22. The advantage of this approach is that only one pass through the lookup table is required.

The Lookup table (9) is implemented using two 512K×8 Flash devices. This provides 19 address inputs and 16 data outputs. By pre-programming the contents of the Flash memory with the appropriate values, any function of 19 inputs is possible.

The Flash table is accessed twice per cell arrival time. The first time is to determine if the connection of the arriving cell should have cell discard (or EPD) action applied to it. The Ti term described in equation C is determined by applying the category, Qubr/abr, WAC and MCRi bits (a total of 18 bits) to the address lines of the Flash memory. Item 23 is a multiplexer which selects the above mentioned bits to form the address bits to the Flash memory. The bit that is used to select these 18 bits at the multiplexer 23, also is the nineteenth bit used to address the Flash memory.

The contents of the Flash memory are programmed such that when the above 19 bit address is applied to the Flash memory the contents of that address contains the Ti value of equation C. Note that the assignment of the input bits to particular address lines of the Flash memory may be done in an arbitrary fashion as long as there is a one to one correspondence between one input bit and one address line.

For the following example the address bits are assigned as follows:

A[18] selects between EPD lookup (if=0) and ER lookup (if=1)
A[17] category bit, equal to 0 for UBR, equal to 1 for ABR
A[16:12] 5 MSB of at 8 bit counter indicating the queue fill level for the category
A[11:3] WAC, a nine bit number having the range [0 . . . 511]
A[2:0] MCRi, a three bit number having the range [0 . . . 7] which corresponds to quantized MCR values. The table below illustrates an association between encoding for the address bits and respective quantized MCRi values. The traffic descriptor's MCR parameter associated with virtual connection, i as established at connection setup, may be mapped to one of the quantized values of MCRi on the basis of closest proximity, rounding up or rounding down.

| A [2:0] | MCRi (cells/sec.) |
|---|---|
| 000 | 10 |
| 001 | 80 |
| 010 | 160 |
| 011 | 320 |
| 100 | 640 |
| 101 | 1280 |
| 110 | 2560 |
| 111 | 5120 |

If the arriving cell is a UBR cell from a connection i with a configured MCRi=2, the current UBR queue fill level is 100 cells, and the WAC has a current value of 10 then the category address bit, A[17] will be a 0, the 5 address lines, A[16:12], corresponding to the Qubr/abr inputs will be 01100, the 9 address lines, A[11:3], corresponding to the WAC inputs will be 000001010 and the 3 address lines, A[2:0], corresponding to the MCRI inputs will be 010.

The resulting address to the Flash memory will be A[17:0]=00011000000001010010 in binary notion or 0xC052 in hexadecimal notation. The contents of address 0xC052 represent the value of Ti and will have been pre-programmed to the correct value according to equation C. Note that the value of Qubr used in the equation is adjusted from the actual queue fill level since only the most significant bit (MSB) of the actual queue fill level are available. Setting the three least significant bits (LSBs) of the queue fill level to zero results in a value of 96 being used (instead of 100).

$Ti=(Qubr*MCRi)/WAC$ $=(96*2)10$ $=19.2$

The calculated value of Ti is rounded to an integer value. Therefore the contents of the Flash memory at address location 0xC052 is 19 decimal. Item 26 is a register used to latch the Ti value. The Timing and Control block (24) is designed to present the per-VC count (Qi) at the same time as the Ti value. A compare function (27) is used to compare the Ti and Qi values. If Qi is greater than Ti, the compare function will instruct the queuing function to set the current connection, i to the EPD state.

The queuing function, for a connection in EPD state, simply discards the next complete (e.g. AAL5) packet received for that connection in accordance with well known functionality.

If the cell arrival is from a connection of the ABR category, the same actions as described above are taken except that the category bit would be set to 1 and the queue fill level of the ABR queue would be used instead of the queue fill level of the UBR queue.

Additionally, if the cell arrival is from a connection of the ABR category, an ERi value for that connection is determined by a second pass through the lookup table, this time with the multiplexer (item 23) selecting MCRi (an 8 bit input) and OBWc (a 10 bit input) as address inputs to the Flash Lookup table. As was the case in the above example dealing with the Lookup of an EPD Threshold value, the assignment of the input bits to the address pins of the Flash memory is arbitrary—the Flash contents are simply pre-programmed appropriately. For this second pass of lookup the value of ERi is read from the lookup table and stored in the second pass latch (25). From this latch the ER information is forwarded (via interface 10a) to the BRM update function as previously described.

An important component of this invention is that the contents of the lookup table can be programmed to perform arbitrarily complex functions. In the example described above, the first pass of the lookup table is used to determine a threshold related to the fair number of cells that can exist in the queue for a particular connection.

The above detailed example is just one of many possible implementations that can be achieved with the Lookup Table concept. The widths and representations of the various variables can be changed and the number of passes through the lookup table can also be changed.

The examples above describe simple queuing functions with a small number of queues. More complex queuing functions may employ schemes which involve the sharing of cell storage (buffers) between multiple queues. In such cases the usage of shared resources will want to be considered in arriving at decisions to perform EPD and in calculating OBW.

Furthermore multiple levels of ABR queue fill and multiple levels of utilization of shared resources can easily be used to make OBW an arbitrarily complex function of these inputs. The ER value can be introduced into either forward resource management cells or backward management cells.

Figure 4A:
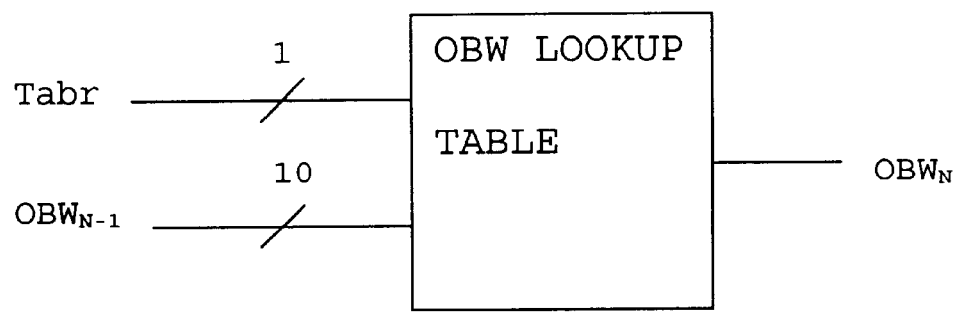
FIGS. 4A and 4B illustrate examples of lookup table implementations for calculating OBW
Figure 4B:
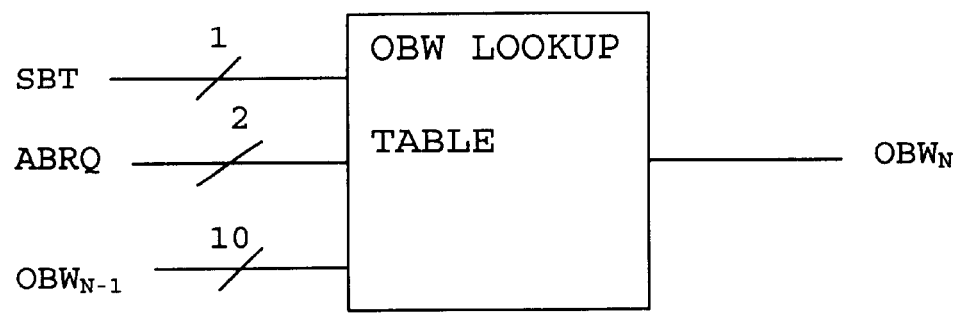

For example, FIGS. 4A and 4B illustrate lookup tables based on calculations for OBW. In FIG. 4A,.the next value of OBW, labeled OBWN, is addressed in the lookup table using the previous value of OBW, labeled $OBW_{N-1}$ as 10 address lines, and Tabr as a single address line. This implementation may be substituted for OBWc generation 22 of FIG. 3. FIG. 4B illustrates a lookup table based implementation of a yet more complex OBW calculation employing many parameters reflective of the congestion status of the particular queuing point. In addition to $OBW_{N-1}$ the address lines for the lookup table include one line corresponding to a shared buffer threshold (e.g. when utilization of a shared buffer space exceeds a predetermined threshold) and two lines representing four regions of queue fill in the ABR queue.

The following is a set of queuing point characteristics that can be used to calculate ER:

queue size;

input rate which is a measure of arrival rate of ABR traffic in a queue;

arrival rate, which is a measure of available bandwidth to an ABR queue or for ABR service (embodied by the aggregation of ABR connections); and historical information used to estimate derivative or rate of change of queue growth.

In general, the above set of characteristics represent any function of queue size relative to time.

This invention applies to any queuing point, and may be tailored to the particular queuing point. For example in the 36170, queuing points exist at the Hub card and at the UCS card.

This technology complies to ITU and ATM Forum standards and can be applied to any switching equipment which requires complex decisions or variable updates to be made at high speed. The immediate application is for switching equipment that supports the ABR and UBR service categories.

While specific embodiments of the invention have been illustrated and disclosed it will be apparent to one skilled in the art that numerous alternatives and variations can be introduced to the basic concept. It is to be understood, however that such variations and alternatives will fall within the scope of the invention as defined by the appended claims.

What is claimed is:

1. A system for deciding whether to discard data traffic at a queuing point in a digital communications network, said system comprising:

means to derive context information for said data traffic at said queuing point, said context information including one or more parameters associated with traffic flow, said parameters including category of service, weighted active connections and minimum cell rate;

a memory having address inputs corresponding to parameters associated with said context information, and said memory providing threshold values depending on said address inputs;

comparison means to compare said context information with threshold values from said memory, means to discard data traffic if one of said parameter values is exceeded; and means to derive explicit rate information associated with category of service, wherein a first pass through said memory determines whether to discard data traffic and a second pass through said memory determines explicit rate information.

2. The system as defined in claim 1 wherein data of multiple categories of service are included in said data traffic.

3. The system as defined in claim 1 wherein said means to discard data traffic implements an early packet discard protocol.

4. The system as defined in claim 1 wherein said digital communications network carries asynchronous transfer mode (ATM) traffic.

5. The system as defined in claim 4 wherein category of service includes available bit rate (ABR) and unspecified bit rate (UBR).

6. The system as defined in claim 1 having nineteen input address lines and sixteen data outputs.

7. The system as defined in claim 6 wherein by preprogramming the memory with appropriate values, any function of the nineteen input address line is possible.

8. The system as defined in claim 5 wherein said memory also derives explicit rate (ER) information for ABR category of service depending on address inputs.

9. A method of deciding whether to discard data traffic at a queuing point in a digital communications network, said method comprising the steps of:

a) deriving context information for said data traffic at said queuing point, said context information including one or more parameters associated with traffic flow, said parameters including category of service, weighted active connections and minimum cell rate;

b) providing a memory having address inputs corresponding address to parameters associated with said statistical information, said memory providing threshold values depending on said address inputs:

c) comparing said context information with threshold values from said memory, d) discarding data traffic if one of said threshold values is exceeded; and e) deriving explicit rate information respecting category of service depending on address inputs wherein a first pass through said memory determines whether to discard data traffic and a second pass through said memory determines explicit rate (ER) information.

10. The method as defined in claim 9 wherein said digital communications network transports asynchronous transfer mode (ATM) traffic.

11. The method as defined in claim 10 wherein multiple category of service traffic is transported through said network.

12. The method as defined in claim 11 wherein available bit rate (ABR) and unspecified bit rate (UBR) categories of service is supported.

13. The method as defined in claim 9 wherein the parameters are supplied to specific ones of said address lines and the values provided by said memory are dependent on said addresses.

* * * * *